Sept. 14, 1954

N. MARCHAND ET AL 2,689,161

HEART SOUND AMPLIFIER

Filed Dec. 3, 1948

INVENTORS
NATHAN MARCHAND
MILTON PELAVIN

BY Harry Cole

ATTORNEY

Patented Sept. 14, 1954

2,689,161

UNITED STATES PATENT OFFICE 2,689,161

HEART SOUND AMPLIFIER

Nathan Marchand, New York, and Milton Pelavin, Brooklyn, N. Y., assignors to Technicon Cardiograph Corporation, New York, N. Y., a corporation of New York Application December 3, 1948, Serial No. 63,304

5 Claims. (Cl. 346—33)

The present invention relates to electronic amplifiers for heart sounds for use in cardiology.

The primary object of the invention is the provision of a heart-sound amplifier which is operable, in conjunction with an electrocardiograph, to produce a flat frequency response of the indicating or recording element of the electrocardiograph to heart sounds particularly in the frequency range of from 50 to 150 cycles per second.

A desirable characteristic of amplifiers for electrocardiographs operable in response to the various extremity and other potentials of the patient's body is such as to provide a flat frequency response of the recorder, as described in the application of Nathan Marchand, Serial No. 762,633, filed July 22, 1947, and assigned to the same assignee as that of this application. In such instruments the response of the writing element decreases with frequencies which are higher than about 60 cycles per second. The present invention enables the same instrument to be used for recording heart sounds with a flat frequency response in the important 50 to 150 cycles per second range of frequencies of heart sounds. The accomplishment of this result constitutes another object of this invention.

The above objects of the invention and objects ancillary thereto will be fully understood from the following description considered in connection with the accompanying illustrative drawings.

Figure 1:
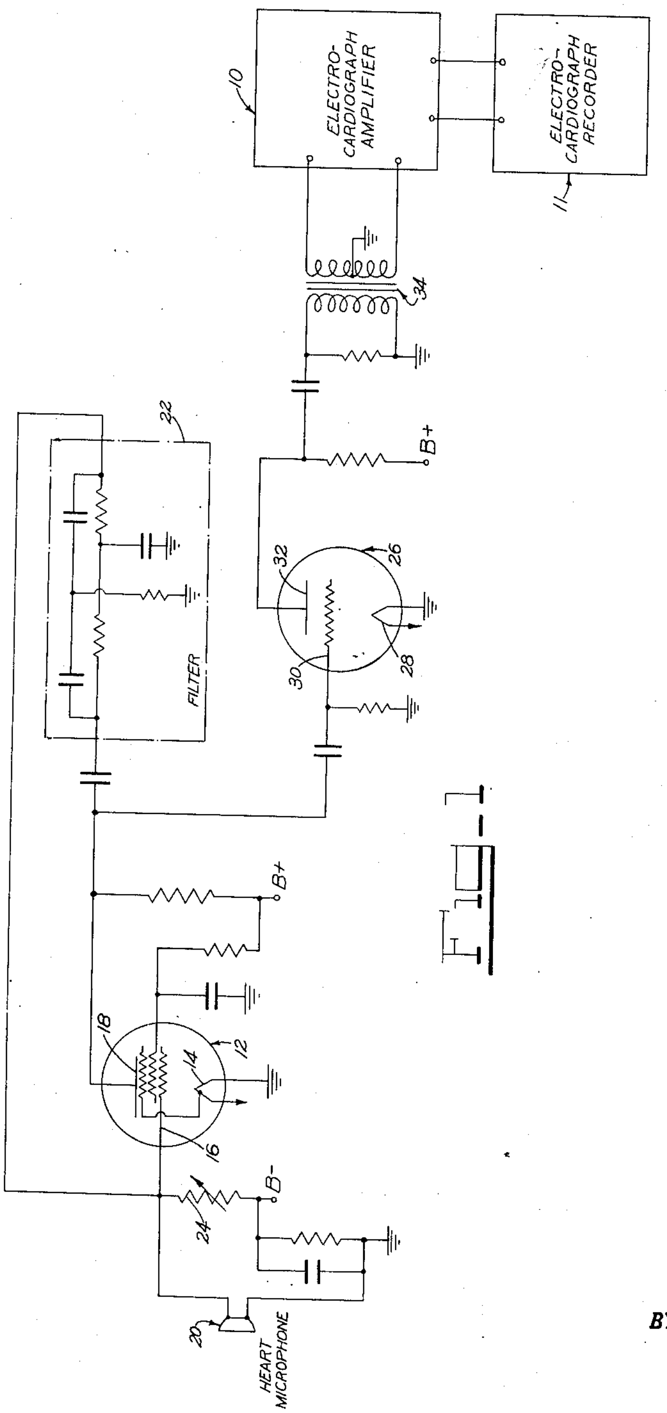
Fig. 1 is a circuit diagram illustrating our invention.

The invention is illustrated as comprising a pre-amplifier for an electrocardiograph which includes an amplifier and a recorder indicated schematically at 10 and 11, respectively. The pre-amplifier of the present invention comprises an electronic amplifier tube 12, here shown as a pentode, the cathode, control grid and plate of which are indicated at 14, 16, and 18, respectively. The heart microphone 20 is connected to the input of amplifier tube 12. Said tube is operated as a conventional high gain audio amplifier and, pursuant to our invention, is provided with an inverse feedback network from the plate to the grid circuit. This feedback network is a filter 22, here shown as a parallel T-filter, and the latter is tuned to approximately 150 cycles per second and acts as a transmission line to all frequencies except 150 cycles per second. Accordingly, the full gain of this stage of amplification is realized only at said frequency of 150 cycles per second.

An adjustable resistance or potentiometer 24, provided in the input circuit, is operable to change the frequency-selective character of the amplifier by changing the transmission characteristic of the filter. It will also be noted that since potentiometer 24 is in the signal input circuit of tube 12, variation thereof will result in varying the amplitude of the signal which is applied to grid 16. It will be understood that the inverse feedback attenuates the frequencies below 50 cycles per second and thus prevents the high-amplitude low frequencies of the heart sounds from masking the low-amplitude high frequencies of the heart sounds, said higher frequencies being those which are important for consideration by the cardiologist.

Following the amplifier stage which includes tube 12, there is an amplifier tube, here shown as triode having a cathode 28, a control grid 30, and a plate 32. It will be understood that the elements of tube 26 may be in the same envelope as that of tube 12 instead of being in a separate envelope as shown. The output circuit of tube 26 includes a shunt fed transformer 34, connected in push-pull as shown. The impedance of the output is low so as to minimize hum pick-up in the line to the cardiograph.

Figure 2:
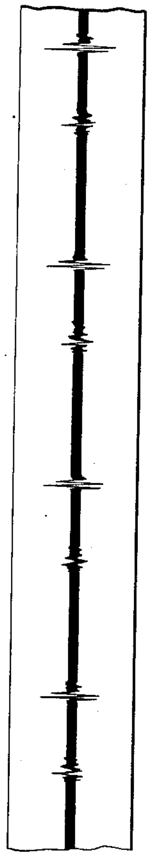
Fig. 2 shows a specimen of a heart-sound record or stethogram.

In the use of the pre-amplifier with the cardiograph, the terminals of the secondary of transformer 34 are plugged into the input terminals of the cardiograph amplifier 10 and the heart microphone 20 is connected to the input of amplifier tube 12. When the microphone is placed against the patient's heart and the cardiograph is operated, a record of the heart sound, or stethogram, of the patient is obtained on the cardiograph recorder 11. When the stethogram pre-amplifier of the present invention is used with the multiple-channel cardiograph shown and described in the above mentioned application of Nathan Marchand, the secondary of transformer 34 is connected to the amplifier of one of the channels, said amplifier being disconnected from the body-extremity leads to which it is normally connected in obtaining a cardiogram, and the provision for frequency damping, as shown in said application, being removed from said channel by opening a switch in the damping circuit. A specimen of a heart-sound record, or stethogram, is shown by Fig. 2.

Certain features disclosed but not claimed herein are claimed in our divisional application Serial No. 402,102, filed December 31, 1953.

It will be understood that our invention is not to be limited to the specific amplifier tubes shown or to other details and that various changes may be made without departing from the underlying idea or principles of our invention within the scope of the appended claims.

Having thus described our invention, what we claim and desire to secure by Letters Patent, is:

1. Electro-cardiograph apparatus for recording body potentials, said apparatus including amplifier means and a direct-writing recorder, said amplifier means having a flat-frequency response characteristic in the range of said potentials whereby the response of the writing element of said recorder decreases with frequencies higher than substantially 60 cycles per second, and means for modifying the frequency response of said apparatus for the recording of body sounds thereby, whereby said writing element has a flat frequency response in a band substantially from 50 to 150 cycles per second.

2. Electro-cardiograph apparatus for recording body potentials, said apparatus including amplifier means and a direct-writing recorder, said amplifier means having a flat-frequency response characteristic in the range of said potentials whereby the response of the writing element of said recorder decreases with frequencies higher than substantially 60 cycles per second, and means for modifying the frequency response of said apparatus for the recording of body sounds thereby, whereby said writing element has a flat frequency response in a band substantially from 50 to 150 cycles per second, said latter means comprising pre-amplifier means connected to the input of said amplifier means, said pre-amplifier means having means to attenuate the relatively high amplitude low frequencies of the body sounds and to transmit the relatively low amplitude high frequencies thereof.

3. Electro-cardiograph apparatus for recording body potentials, said apparatus including amplifier means and a direct-writing recorder, said amplifier means having a flat-frequency response characteristic in the range of said potentials whereby the response of the writing element of said recorder decreases with frequencies higher than substantially 60 cycles per second, and means for modifying the frequency response of said apparatus for the recording of body sounds thereby, whereby said writing element has a flat frequency response in a band substantially from 50 to 150 cycles per second, said latter means comprising pre-amplifier means connected to the input of said amplifier means, said pre-amplifier means having means to attenuate the relatively high amplitude low frequencies of the body sounds and to transmit the relatively low amplitude high frequencies thereof, said pre-amplifier means being peaked at substantially 150 cycles per second.

4. Electro-cardiograph apparatus for recording body potentials, said apparatus including amplifier means and a direct-writing recorder, said amplifier means having a flat-frequency response characteristic in the range of said potentials whereby the response of the writing element of said recorder decreases with frequencies higher than substantially 60 cycles per second, and means for modifying the frequency response of said apparatus for the recording of body sounds thereby, whereby said writing element has a flat frequency response in a band substantially from 50 to 150 cycles per second, said latter means comprising pre-amplifier means connected to the input of said amplifier means, said pre-amplifier means having means to attenuate the relatively high amplitude low frequencies of the body sounds and to transmit the relatively low amplitude high frequencies thereof, said pre-amplifier comprising an audio frequency amplifier having at least a cathode, an anode and a control grid, and a filter network connected in inverse feedback relation in the anode to grid circuit of said amplifier, said filter network being adjusted to reject frequencies substantially of 150 cycles per second.

5. Electro-cardiograph apparatus for recording body potentials, said apparatus including amplifier means and a direct-writing recorder, said amplifier means having a flat-frequency response characteristic in the range of said potentials whereby the response of the writing element of said recorder decreases with frequencies higher than substantially 60 cycles per second, and means for modifying the frequency response of said apparatus for the recording of body sounds thereby, whereby said writing element has a flat frequency response in a band substantially from 50 to 150 cycles per second, said latter means comprising pre-amplifier means connected to the input of said amplifier means, said pre-amplifier means having means to attenuate the relatively high amplitude low frequencies of the body sounds and to transmit the relatively low amplitude high frequencies thereof, said pre-amplifier comprising an audio frequency amplifier having at least a cathode, an anode and a control grid, and a filter network connected in inverse feedback relation in the anode to grid circuit of said amplifier, said filter network being adjusted to reject frequencies substantially of 150 cycles per second and a single potentiometer in circuit with said control grid and connected to said network to concomitantly vary both the signal input to said audio frequency amplifier and the frequency transmission characteristic of said network.

References Cited in the file of this patent

UNITED STATES PATENTS

| Number | Name | Date |
|---|---|---|
| 1,647,710 | Nichols | Nov. 1, 1927 |
| 1,936,438 | Roder | Nov. 21, 1933 |
| 2,073,412 | Cappelli | Mar. 9, 1937 |
| 2,131,365 | Black | Sept. 27, 1938 |
| 2,173,426 | Scott | Sept. 19, 1939 |
| 2,173,427 | Scott | Sept. 19, 1939 |
| 2,245,365 | Riddle | June 10, 1941 |
| 2,317,025 | Bond | Apr. 20, 1943 |
| 2,370,483 | Muffly | Feb. 27, 1945 |
| 2,457,744 | Sturm | Dec. 28, 1948 |
| 2,502,419 | Cannon et al | Apr. 4, 1950 |